(12) United States Patent
Bjornsson

(10) Patent No.: US 8,751,739 B1
(45) Date of Patent: Jun. 10, 2014

(54) DATA DEVICE SPARES

(75) Inventor: Magnus E. Bjornsson, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 513 days.

(21) Appl. No.: 13/065,851

(22) Filed: Mar. 31, 2011

(51) Int. Cl.
*G06F 12/00* (2006.01)
*G06F 13/00* (2006.01)

(52) U.S. Cl.
USPC ............ 711/112; 711/100; 711/154; 711/170

(58) Field of Classification Search
CPC .... G06F 12/00; G06F 3/0629; G06F 12/0223
USPC .......... 711/100, 111, 112, 113, 118, 154, 170
See application file for complete search history.

(56) References Cited

U.S. PATENT DOCUMENTS

| | | | |
|---|---|---|---|
| 5,093,913 A * | 3/1992 | Bishop et al. ................. | 711/152 |
| 5,206,939 A | 4/1993 | Yanai et al. | |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,820,173 B1 * | 11/2004 | Bittel et al. ................... | 711/137 |
| 7,073,024 B1 | 7/2006 | Chilton | |
| 7,340,489 B2 | 3/2008 | Vishlitzky et al. | |
| 7,596,569 B2 * | 9/2009 | Bacon et al. .......................... | 1/1 |
| 7,640,388 B2 * | 12/2009 | Nakashima et al. .......... | 711/103 |
| 7,822,939 B1 | 10/2010 | Veprinsky et al. | |

* cited by examiner

*Primary Examiner* — Tuan Thai
(74) *Attorney, Agent, or Firm* — Muirhead and Saturnelli, LLC

(57) ABSTRACT

Automatically allocating storage space for a storage pool includes providing at least one spares pool containing unused data devices and moving at least one the unused data devices to the storage pool in response to a write causing the available space of the storage pool to be exceeded and/or the available storage space of the storage pool exceeding a predetermined amount. The predetermined amount may be an amount of used storage space that varies according to at least one of: the size and activity level of the pool. The data devices may be logical devices. The pools may correspond to storage space in a single storage device or may correspond to storage space in multiple storage devices.

19 Claims, 6 Drawing Sheets

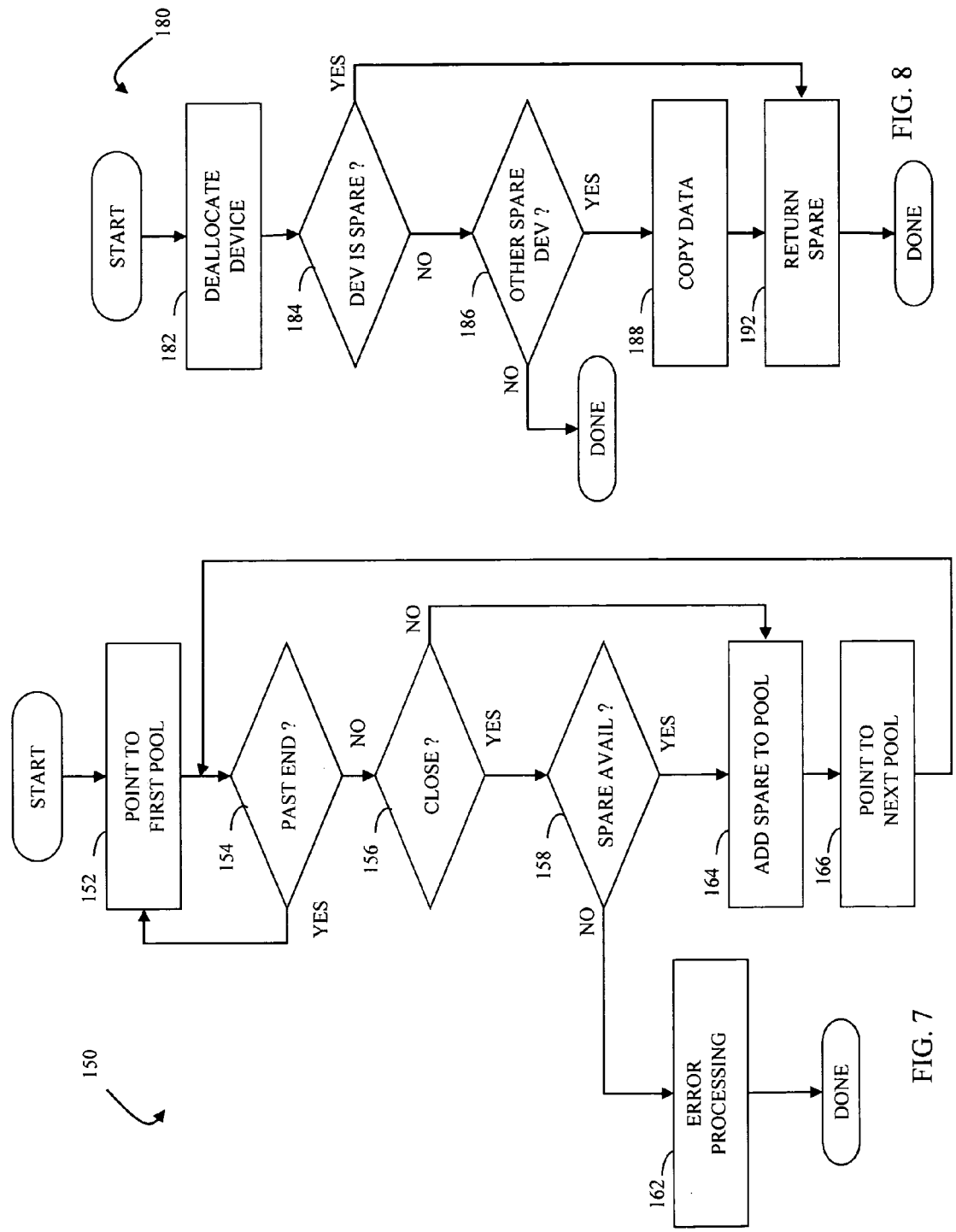

DATA DEVICE SPARES

BACKGROUND OF THE INVENTION

1. Technical Field

This application relates to computer storage devices, and more particularly to the field of allocating storage devices for use.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some cases, it may be possible to organize storage into "pool" that are accessed by an application or set of applications (e.g., owned by a particular user or organization). Such pools are useful for a number of reasons, including the ability to manage and control storage for a particular user/organization. A storage pool may be assigned by a storage manager, who handles management of storage for an entire storage device.

A drawback to using storage pools is the necessity of manually monitoring the size of the pools to ensure that none of the pools run out of space (i.e., an amount of data is written to a pool that exceeds the pool's capacity). In large systems, this may be impractical, especially if there are a significant number of storage pools.

Accordingly, it is desirable to be able to allocate more space for storage pools in an efficient manner.

SUMMARY OF THE INVENTION

According to the system described herein, automatically allocating storage space for a storage pool includes providing at least one spares pool containing unused data devices and moving at least one the unused data devices to the storage pool in response to a write causing the available space of the storage pool to be exceeded and/or the available storage space of the storage pool exceeding a predetermined amount. The predetermined amount may be an amount of used storage space that varies according to at least one of: the size and activity level of the pool. The data devices may be logical devices. The pools may correspond to storage space in a single storage device. The pools may correspond to storage space in multiple storage devices. A cloud appliance may present storage from multiple storage devices as a single storage space. Automatically allocating storage space for a storage pool may also include determining if the spares pool contains sufficient data devices to provide the storage pool with enough memory for data written thereto. Automatically allocating storage space for a storage pool may also include performing error processing in response to the spares pool not containing sufficient data devices.

According further to the system described herein, computer software, provided in a non-transitory computer-readable medium, automatically allocates storage space for a storage pool. The software includes executable code that provides at least one spares pool containing unused data devices and executable code that moves at least one of the unused data devices to the storage pool in response to at least one of: a write causing the available space of the storage pool to be exceeded and the available storage space of the storage pool exceeding a predetermined amount. The predetermined amount may be an amount of used storage space that varies according to at least one of the size and activity level of the pool. The data devices may be logical devices. The pools may correspond to storage space in a single storage device. The pools may correspond to storage space in multiple storage devices. The software may also include executable code that presents storage from multiple storage devices as a single storage space. The software may also include executable code that determines if the spares pool contains sufficient data devices to provide the storage pool with enough memory for data written thereto. The computer software may also include executable code that performs error processing in response to the spares pool not containing sufficient data devices.

According further to the system described herein, a data storage device includes a plurality of disks and a plurality of directors coupled to the disks to handle dataflow therebetween, where the directors include executable code that provides at least one spares pool containing unused data devices and executable code that moves at least one of the unused data devices to a storage pool in response to at least one of: a write causing the available space of the storage pool to be exceeded and the available storage space of the storage pool exceeding a predetermined amount. The predetermined amount may be an amount of used storage space that varies according to at least one of: the size and activity level of the pool. The data devices may be logical devices. The directors may include include executable code that determines if the spares pool contains sufficient data devices to provide the storage pool with enough memory for data written thereto.

BRIEF DESCRIPTION OF DRAWINGS

FIG. 7 is a flow chart illustrating steps performed in connection with obtaining a spare data device for a storage pool according to an embodiment of the system described herein.

FIG. 8 is a flow chart illustrating steps performed in connection with deallocating data for a storage pool according to an embodiment of the system described herein.

DETAILED DESCRIPTION OF VARIOUS EMBODIMENTS

Figure 1:
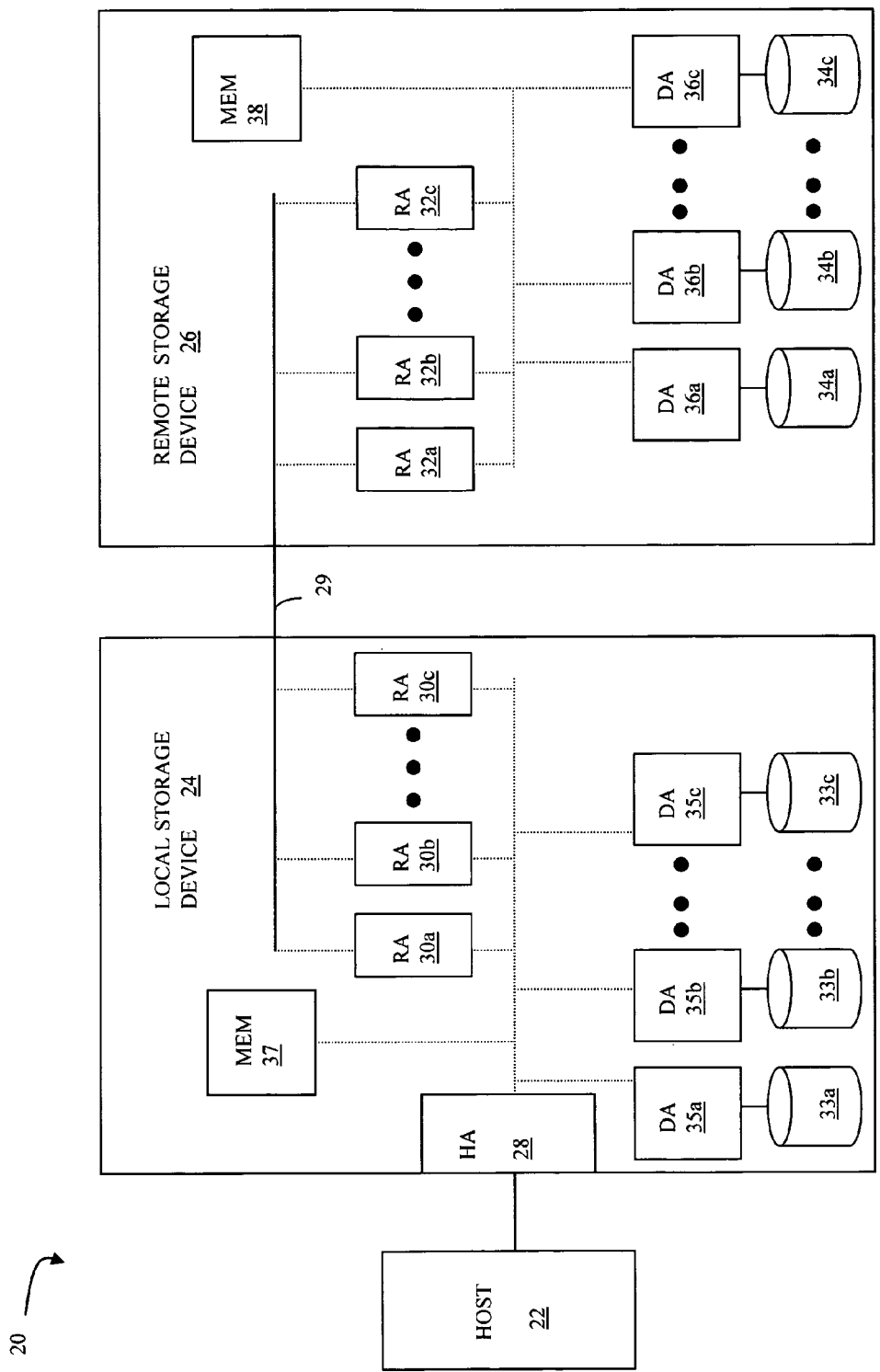
FIG. 1 is a schematic diagram showing a host, a local storage device, and a remote data storage device used in connection with an embodiment of the system described herein.

Referring to FIG. 1, a diagram 20 shows a relationship between a host 22, a local storage device 24, and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via an RDF link 29 to cause the data on the remote storage device 26 to be identical to the data on the local storage device 24. Although only one link is shown (the link 29), it is possible to have additional links between the storage devices 24, 26 and to have links between one or both of the storage devices 24, 26 and other storage devices (not shown). In addition, the link 29 may be provided using a direct connection (wired, over-the-air, or some combination thereof), a network (such as the Internet), or any other appropriate means for conveying data. Note that there may be a time delay between the transfer of data from the local storage device 24 to the remote storage device 26, so that the remote storage device 26 may, at certain points in time, contain data that is not identical to the data on the local storage device 24. Communication using RDF is described, for example, in U.S. Pat. No. 5,742,792 titled "REMOTE DATA MIRRORING" to Yanai, et al., which is incorporated by reference herein.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail hereinafter.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The RDF functionality described herein may be applied so that the data for at least a portion of the disks 33a-33c of the local storage device 24 is copied, using RDF, to at least a portion of the disks 34a-34c of the remote storage device 26. It is possible that other data of the storage devices 24, 26 is not copied between the storage devices 24, 26, and thus is not identical.

Each of the disks 33a-33c is coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 are used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 includes a global memory 38 that may contain tasks that are to be performed by one or more of the DA's 36a-36c and the RA's 32a-32c, and a cache for data fetched from one or more of the disks 34a-34c. Use of the memories 37, 38 is described in more detail hereinafter.

The storage space in the local storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c. The local storage device 24 may present standard logical devices to the host 22.

Providing an RDF mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the RDF mapping causes modified data to be transferred from the local storage device 24 to the remote storage device 26 using the RA's, 30a-30c, 32a-32c and the RDF link 29. In steady state operation, the logical device on the remote storage device 26 contains data that is identical to the data of the logical device on the local storage device 24. The logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume. The system described herein may be implemented using software, hardware, and/or a combination of software and hardware where software may be stored in an appropriate storage medium and executed by one or more processors.

Figure 2:
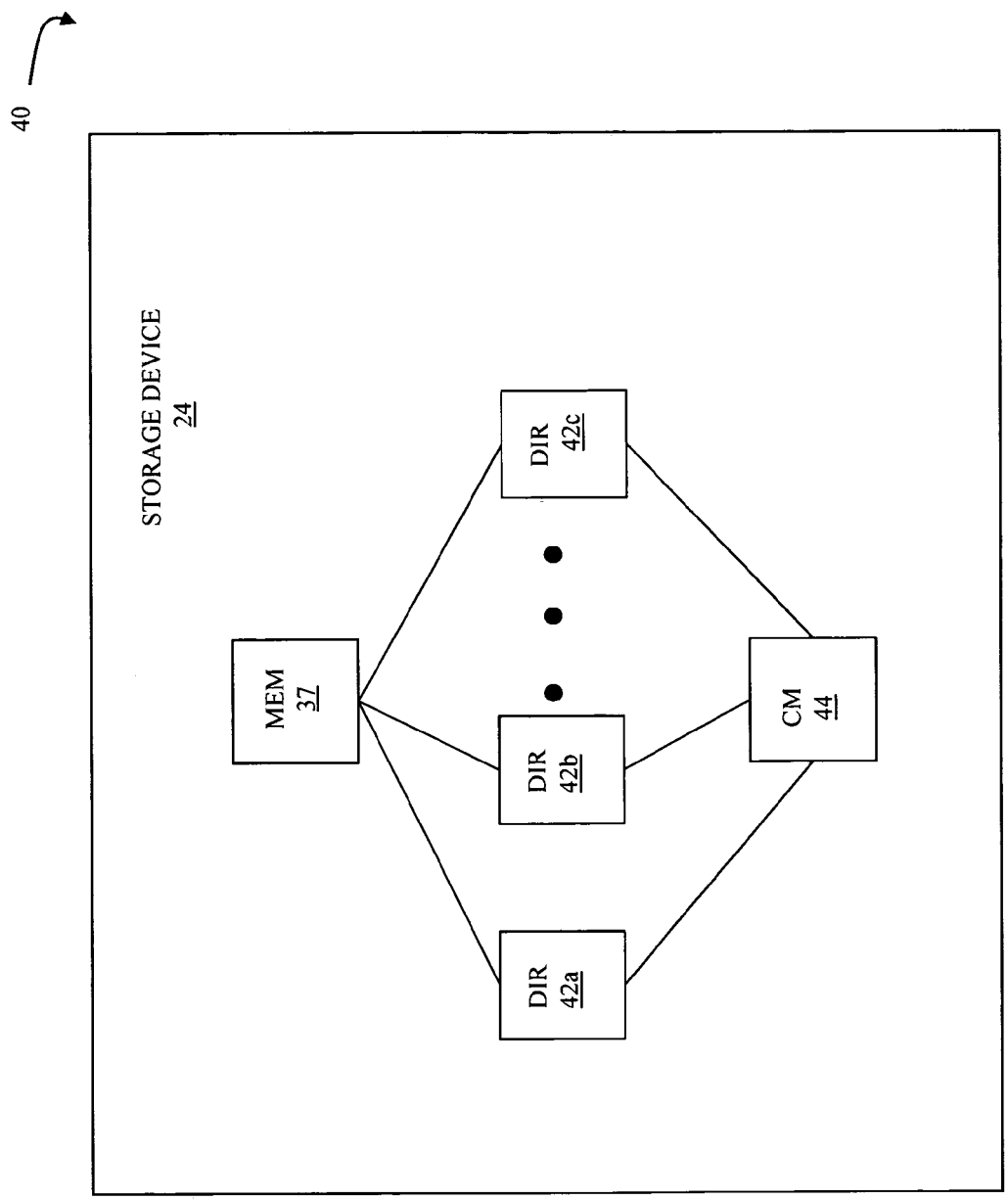
FIG. 2 is a schematic diagram showing a storage device, memory, a plurality of directors, and a communication module that may be used in connection with an embodiment of the system described herein.

Referring to FIG. 2, a diagram 40 illustrates an embodiment of the storage device 24 where each of a plurality of directors 42a-42c are coupled to the memory 37. Each of the directors 42a-42c represents the HA 28 (and/or other HA's), the RA's 30a-30c, or DA's 35a-35c. In an embodiment disclosed herein, there may be up to sixty four directors coupled to the memory 37. Of course, for other embodiments, there may be a higher or lower maximum number of directors that may be used.

The diagram 40 also shows an optional communication module (CM) 44 that provides an alternative communication path between the directors 42a-42c. Each of the directors 42a-42c may be coupled to the CM 44 so that any one of the directors 42a-42c may send a message and/or data to any other one of the directors 42a-42c without needing to go through the memory 37. The CM 44 may be implemented using conventional MUX/router technology where a sending one of the directors 42a-42c provides an appropriate address to cause a message and/or data to be received by an intended receiving one of the directors 42a-42c. Some or all of the functionality of the CM 44 may be implemented using one or more of the directors 42a-42c so that, for example, the directors 42a-42c may be interconnected directly with the interconnection functionality being provided on each of the directors 42a-42c. In addition, a sending one of the directors 42a-42c may be able to broadcast a message to all of the other directors 42a-42c at the same time.

In some embodiments, one or more of the directors 42a-42c may have multiple processor systems thereon and thus may be able to perform functions for multiple directors. In some embodiments, at least one of the directors 42a-42c having multiple processor systems thereon may simultaneously perform the functions of at least two different types of directors (e.g., an HA and a DA). Furthermore, in some embodiments, at least one of the directors 42a-42c having multiple processor systems thereon may simultaneously perform the functions of at least one type of director and perform other processing with the other processing system. In addition, all or at least part of the global memory 37 may be provided on one or more of the directors 42a-42c and shared with other ones of the directors 42a-42c.

Figure 3:
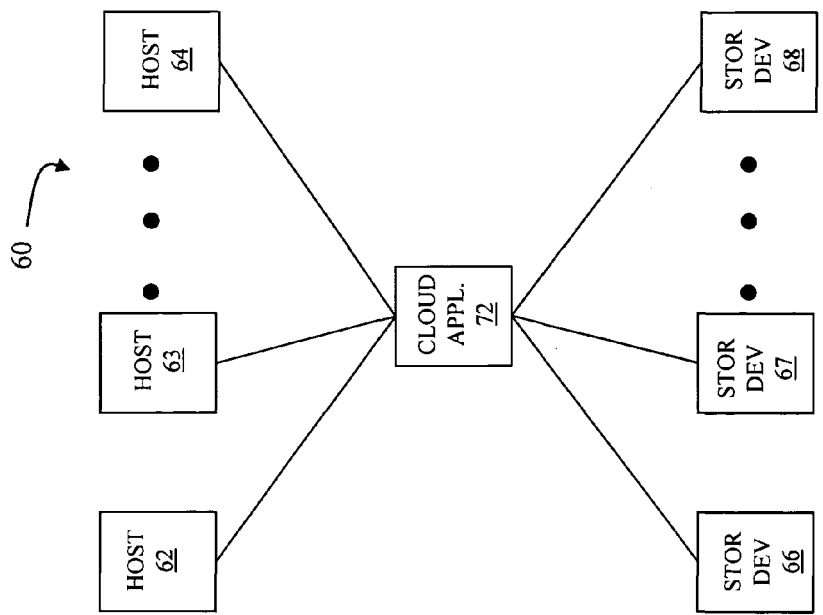
FIG. 3 is a schematic diagram showing a plurality of hosts, a plurality of storage devices, and a cloud appliance that may be used in connection with an embodiment of the system described herein.

Referring to FIG. 3, a diagram 60 shows a plurality of hosts 62-64 and a plurality of storage devices 64-66 coupled to a cloud appliance 72. The connections between hosts 62-64, the storage devices 66-68, and the cloud appliance 72 may be any appropriate connection for providing data transfer therebetween, including direct connections and/or connections using an appropriate network, such as the Internet. In some instances, there may be other connections between the hosts 62-64 (not shown in FIG. 3), between the storage devices 66-68 (not shown in FIG. 3), and/or between at least one of the hosts 62-64 and at least one of the storage devices 66-68 (not shown in FIG. 3).

The hosts 62-64 may be computing devices capable of providing any type of computing functionality, including running user applications, providing server functionality, etc. Although only three hosts 62-64 are shown in the diagram 60, the system described herein may be implemented using any number of hosts. Similarly, although only three storage devices 66-68 are shown in the diagram 60, the system described herein may be implemented using any number of storage devices.

The cloud appliance 72 may be an EMC VPLEX Family product provided by EMC Corporation of Hopkinton, Mass. or may a similar product capable of providing the functionality described herein. The cloud appliance 72 may be a single device or may be implemented using multiple discrete devices, possibly interconnected using one or more appropriate connections, networks, etc. In an embodiment herein, the cloud appliance 72 may present at least some of the available storage to the hosts 62-64 as a single unified storage space where the actual physical location of particular data on one of the storage devices 66-68 is transparent to the hosts 62-64.

Note that, although specific storage device configurations are disclosed in connection with FIG. 1, FIG. 2 and FIG. 3, it should be understood that the system described herein may be implemented on any appropriate platform. Thus, the system described herein may be implemented using a platform like that described in connection with FIG. 1 and/or FIG. 2 and/or FIG. 3 or may be implemented using a platform that is somewhat or even completely different from any particular platform described herein.

Figure 4:
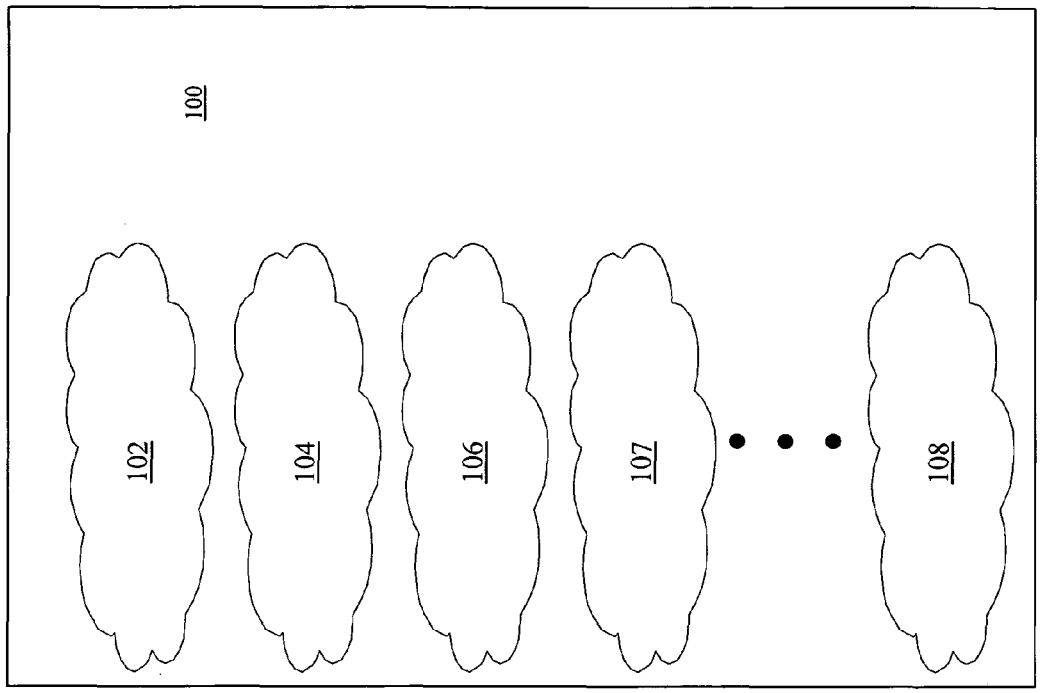
FIG. 4 is a schematic diagram showing a storage space and a plurality of storage pools according to an embodiment of the system described herein.

Referring to FIG. 4, a storage space 100 is shown as including a first special purpose storage pool 102, a second special purpose storage pool 104, and a plurality of general user storage pools 106-108. The storage space 100 may correspond to storage of a single one of the storage devices 66-68 or may correspond to multiple ones of the storage devices 66-68 that may be presented as a single storage space by the cloud appliance 72, discussed above. Each of the storage pools 102, 104, 106-108 includes storage that may be made available for one or more of the hosts 62-64. In an embodiment herein, the storage space 100 represent the storage of a Symmetrix storage device provided by EMC Corporation of Hopkinton, Mass., the special purpose storage pool 102 contains unassigned storage for log devices (described, for example, in U.S. Pat. No. 7,340,489 to Vishlitzky, et al., which is incorporated by reference herein), the special purpose storage pool 104 contains unassigned storage for thin devices (described, for example, in U.S. Pat. No. 7,822,939 to Veprinsky, et al., which is incorporated by reference herein), and the user storage pools 106-108 contain user storage that is configured and accessed by one or more applications on the hosts 62-64. Of course, other configurations are possible. For example, the storage space 100 may be a logical storage space configured by the cloud appliance 72 for physical storage on a plurality of the storage devices 66-68.

Figures 5, 6:
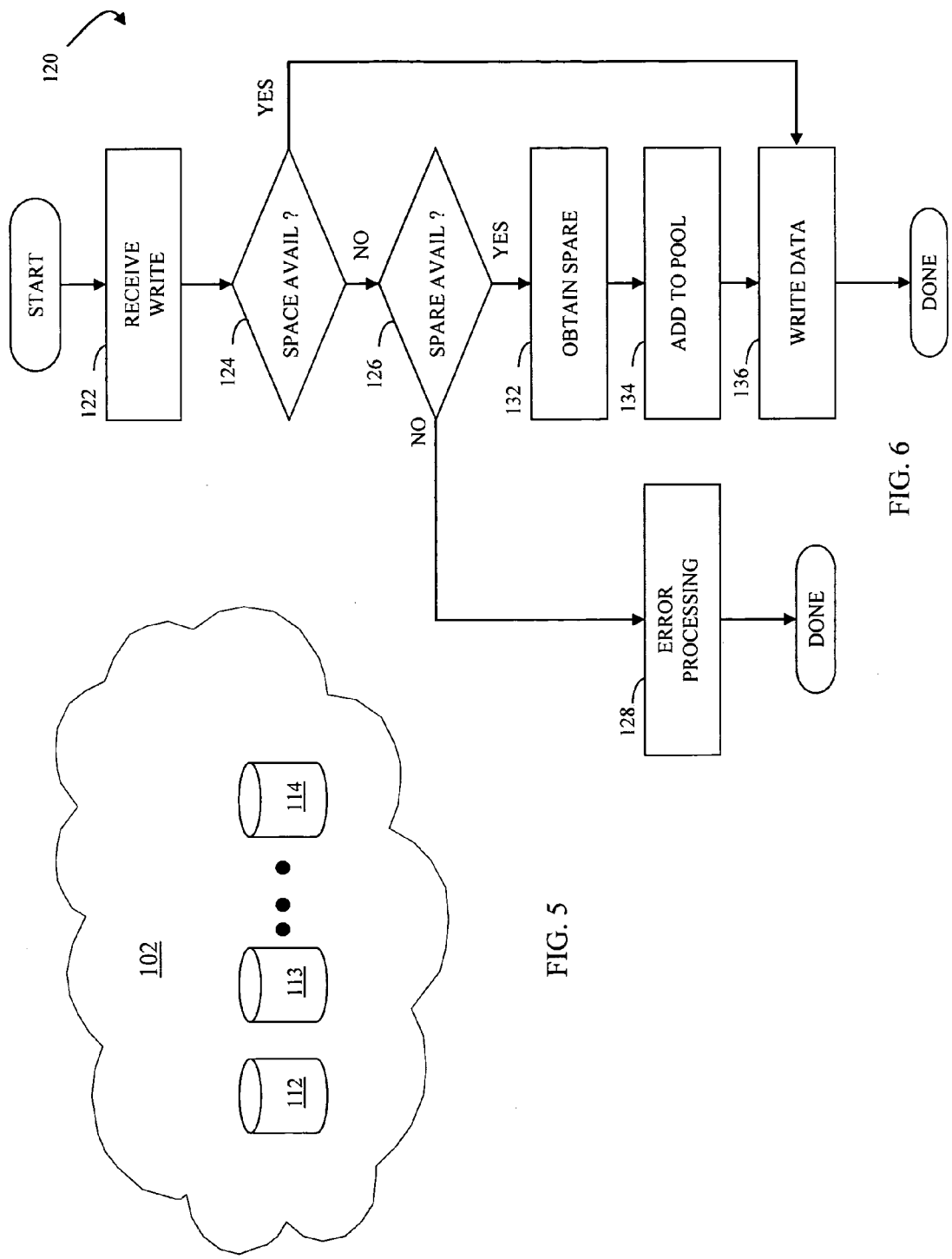
FIG. 5 is a schematic diagram showing a storage pool with a plurality of data devices according to an embodiment of the system described herein.
FIG. 6 is a flow chart illustrating steps performed in connection with writing data to a storage pool according to an embodiment of the system described herein.

Referring to FIG. 5, the storage pool 102 is shown in more detail as including a plurality of data devices 112-114. The other storage pools 104, 106-108 may be configured with data devices similarly to the storage pool 102. The data devices 112-114 may be implemented as logical devices like standard logical devices provided in a Symmetrix data storage device. In some embodiments, the data devices 112-114 may not be directly useable (visible) to the hosts 62-64. Each of the data devices 112-114 may correspond to a portion (possibly a whole portion) of one or more of the disk drives of a storage device. Although only three data devices 112-114 are shown, the system described herein may be implemented using any number of data devices in a pool.

Referring to FIG. 6, a flow chart 120 illustrates steps performed in connection with a write of data to one of the user pools 106-108 causing the amount of storage space that is available to be exceeded. Note that the processing illustrated by the flow chart 120 (and other processing described herein) may be provided by one or more of the directors 42a-42c and/or any other processing device, including the host 22, the cloud appliance 72, etc.

Processing for the flow chart 120 begins at a first step 122 where the write command/data is received. Following the first step 122 is a test step 124 where it is determined whether there is space available to accommodate the data being written. If not, then control transfers from the test step 124 to a test step 126 where it is determined if a spare data device is available for use. In an embodiment herein, spare data devices are unused data devices that may be provided by one of the special storage pools 102, 104. In other embodiments, spare data devices may also (or instead) be provided by one or more of the user pools 106-108 that has been especially allocated for that purpose.

If it is determined at the test step 126 that no spare data devices are available (i.e., all spare data devices have been previously used), then control transfers from the test step 126 to a step 128 where error processing is performed. The specific error processing provided at the step 128 is implementation dependent, and may include providing a message to a user/process performing the write operation. Following the step 128, processing is complete.

If it is determined at the test step 126 that spare data device(s) are available, then control transfers from the test step 126 to a step 132 where the spare data device(s) (spares) are obtained (e.g., from the special storage pool 104). Following the step 132 is a step 134 where the spare data device(s) obtained at the step 132 are added to the user pool to which the write is being performed. Following the step 134 is a step 136 where the write operation is performed. Note that the step 136 is also reached from the test step 124 if it is determined at the test step 124 that the user pool to which the write is being performed already has available space. Following the step 136, processing is complete.

In some embodiments, it may be desirable to add spare data devices to pools prior to the pools running out of space when a write operation is performed. That is, it may be desirable to determine if a user pool is close to being full and, if so, add data devices to the pool. This processing may be done in addition to or instead of the processing described above in connection with the flow chart 120. In an embodiment herein, the test for being close to full determines the percentage of used space as a threshold that changes according to the pool size and/or an activity level (i.e., number of reads and writes per unit time). As the pool size increases, the percentage threshold indicating full also increases. Also, as the pool becomes more active, the percentage threshold indicating full decreases. For example, the threshold may be 95% used for a one hundred gigabyte pool, but the threshold may change to 98% used for a one-terabyte pool. The threshold may also change from 95% to 98% as the pool becomes less active.

Referring to FIG. 7, a flow chart 150 illustrates steps performed in connection with adding spare data devices to pools that are close to being full. Processing begins at a first step 152 where a pointer that iterates through all of the user pools 106-108 is set to point to the first pool. Following the step 152 is a test step 154 where it is determined if the pointer used to iterate through all of the pools points past the last pool (i.e., all pools have been processed). If so, then control transfers back to the step 152 to reset the pointer back to the first pool. Otherwise control transfers from the test step 154 to a test step 156 where it is determined if the amount of storage space used by the current user pool (as indicated by the iteration pointer) exceeds a predetermined threshold. In an embodiment herein, this threshold could be an amount of used storage space that varies according to at least one of: the size and activity level of the pool, but other thresholds could be used, including other thresholds with different threshold metrics (e.g., a fixed amount of space irrespective of the size of the pool).

In some embodiments, spare data devices that are reallocated to user pools may remain therewith. However, in other embodiments, it may be desirable to return the spare data devices to the source thereof (e.g., the special storage pool 104) when the extra storage space is no longer needed. For example, a user pool may need extra storage space once per week when a particular application is run (e.g., payroll processing). In such a case, data device spares may be temporarily allocated to the user pool as needed and then returned to the spare pool when the extra storage space is no longer needed.

Referring to FIG. 8, a flow chart 180 illustrates a data deallocation routine performed for a user pool in connection with returning previously-used data device spares. Processing begins at a first step 182 where a data device is deallocated (e.g., in response to a call from a user application that uses the pool). Following the step 182 is a test step 184 where it is determined if device that was deallocated at the step 182 was a "borrowed" data device that was previously allocated to the user pool from the data device spares pool (either a dedicated pool or some other pool from which data device spares are provided). If not, then control transfers from the test step 184 to a test step 186 where it is determined if the user pool has at least one (currently used) data device from the spare data device pool. If not, then processing is complete—there are no data devices to return to the spare data device pool.

If it is determined at the test 186 that the user pool has at least one data device from the spare data device pool, then control transfers from the step 186 to a step 188 where data is copied from the (currently used) spare data device to the data device that was just deallocated (at the step 182). Following the step 188 is a step 192 where the (now empty) borrowed data device is returned to the spare data device pool. Note that the step 192 is also reached from the step 184 if the device that had been deallocated at the step 182 was a spare data device. Following the step 192, processing is complete.

In some cases, it may not be necessary to return the specific device that had been allocated to a user pool from a spare pool. Instead, it may be sufficient that a user pool that uses spare data devices returns any deallocated data devices, up to the number of data devices that had been allocated from he spare pool. For example, if a user pool receives five additional data devices, the user pool may return up to five (but no more) data devices to the spare data device pool as the data devices are deallocated for the user pool. In such a case, it may be possible to increment a count value each time a spare data device is provided to a user pool and then use that count in connection with deallocation.

Figure 9:
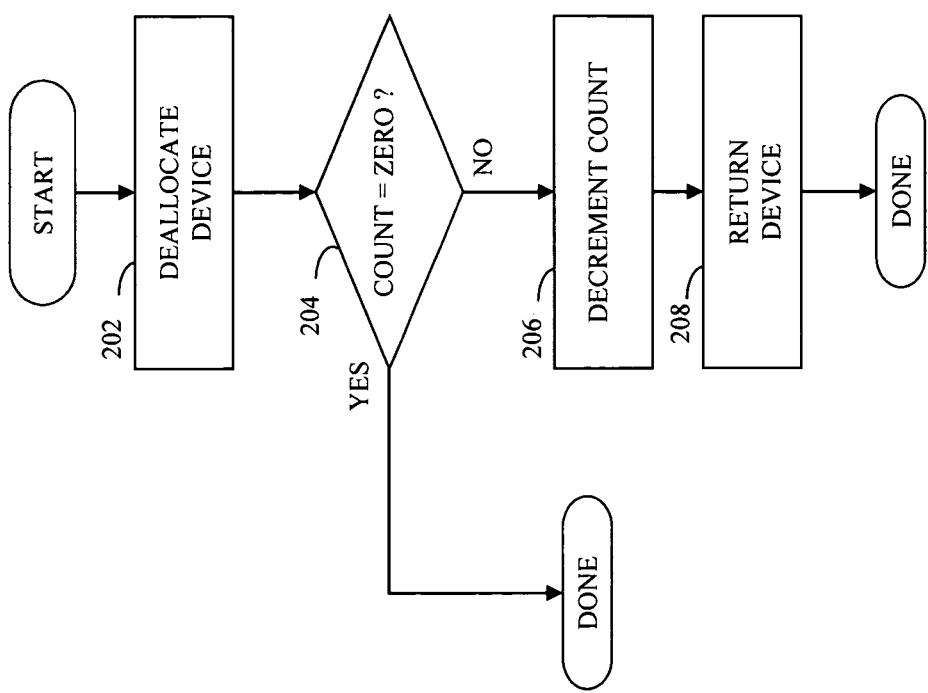
FIG. 9 is a flow chart illustrating steps performed in connection with deallocating data for a storage pool according to an alternative embodiment of the system described herein.

Referring to FIG. 9, a flow chart 200 illustrates steps performed in connection with returning data devices to a spare pool when data devices for a user pool are deallocated. Processing begins at a first step 202 where a data device is deallocated (e.g., in response to a call from a user application that uses the pool). Following the step 202 is a test step 204 where it is determined if the value of a count variable that keeps track of the number of spare data devices allocated to the spare data device pool is zero. If so, then processing is complete (i.e., there are no outstanding "borrowed" spare data devices for the user pool to return). Otherwise, control transfers from the test step 204 to a step 206 where the value of count is decremented. Following the step 206 is a step 208 where the deallocated data device is returned to the spare data device pool. Following the step 208, processing is complete.

Various embodiments discussed herein may be combined with each other in appropriate combinations in connection with the system described herein. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein.

In some instances, the order of steps in the flowcharts, flow diagrams and/or described flow processing may be modified, where appropriate. Further, various aspects of the system described herein may be implemented using software, hardware, a combination of software and hardware and/or other modules or devices having the described features and performing the described functions. Software implementations of the system described herein may include executable code that is stored in a non-volatile computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

While the invention has been disclosed in connection with various embodiments, modifications thereon will be readily apparent to those skilled in the art. Accordingly, the spirit and scope of the invention is set forth in the following claims.

What is claimed is:

1. A method of automatically allocating storage space for a first storage pool, comprising:
   providing at least one spares pool containing unused data devices, wherein the unused data devices of the at least one spares pool are available for use by any of a plurality of storage pools, including the first storage pool;
   providing a cloud appliance that presents the at least one spares pool and at least the first storage pool of the plurality of storage pools as available to at least one host, wherein the cloud appliance is coupled via a network to the at least one host and to at least one storage device including underlying physical memory on which data corresponding to used data devices is stored;
   determining when a write from the at least one host to available space of the first storage pool causes a predetermined threshold, corresponding to the available space of the first storage pool, to be exceeded; and
   moving, by configuration of the cloud appliance, at least one of the unused data devices from the at least one spares pool to the first storage pool in response to determining that the predetermined threshold is exceeded.

2. A method, according to claim 1, wherein the predetermined threshold corresponds to an amount of used storage space that varies according to at least one of: size and activity level of the first storage pool.

3. A method, according to claim 1, wherein the data devices are logical devices.

4. A method, according to claim 1, wherein the at least one spares pool and the first storage pool correspond to storage space in a single storage device.

5. A method, according to claim 1, wherein the at least one spares pool and the first storage pool correspond to storage space in multiple storage devices.

6. A method, according to claim 1, further comprising:
   determining if the at least one spares pool contains sufficient data devices to provide the first storage pool with enough memory for data written thereto.

7. A method, according to claim 6, further comprising:
   performing error processing in response to the at least one spares pool not containing sufficient data devices.

8. Computer software, provided in a non-transitory computer-readable medium, that automatically allocates storage space for a first storage pool, the software comprising:
   executable code that provides at least one spares pool containing unused data devices, wherein the unused data devices of the at least one spares pool are available for use by any of a plurality of storage pools, including the first storage pool;
   executable code that provides a cloud appliance that presents the at least one spares pool and at least the first storage pool of the plurality of storage pools as available to at least one host, wherein the cloud appliance is coupled via a network to the at least one host and to at least one storage device including underlying physical memory on which data corresponding to used data devices is stored;
   executable code that determines when a write from the at least one host to available space of the first storage pool causes a predetermined threshold, corresponding to the available space of the first storage pool, to be exceeded; and
   executable code that, by configuration of the cloud appliance, moves at least one of the unused data devices from the at least one spares pool to the first storage pool in response to determining that the predetermined threshold is exceeded.

9. Computer software, according to claim 8, wherein the predetermined threshold corresponds to an amount of used storage space that varies according to at least one of: size and activity level of the first storage pool.

10. Computer software, according to claim 8, wherein the data devices are logical devices.

11. Computer software, according to claim 8, wherein the at least one spares pool and the first storage pool correspond to storage space in a single storage device.

12. Computer software, according to claim 8, wherein the at least one spares pool and the first storage pool correspond to storage space in multiple storage devices.

13. Computer software, according to claim 12, further comprising:
    executable code that presents storage from multiple storage devices as a single storage space.

14. Computer software, according to claim 8, further comprising:
    executable code that determines if the at least one spares pool contains sufficient data devices to provide the first storage pool with enough memory for data written thereto.

15. Computer software, according to claim 14, further comprising:
    executable code that performs error processing in response to the at least one spares pool not containing sufficient data devices.

16. A data storage device, comprising:
    a plurality of disks; and
    a plurality of directors coupled to the disks to handle dataflow therebetween, wherein the directors include:
       executable code that provides at least one spares pool containing unused data devices, wherein the unused data devices of the at least one spares pool are available for use by any of a plurality of storage pools, including the first storage pool;
       executable code that provides a cloud appliance that presents the at least one spares pool and at least the first storage pool of the plurality of storage pools as available to at least one host, wherein the cloud appliance is coupled via a network to the at least one host and to at least one storage device including underlying physical memory on which data corresponding to used data devices is stored;
       executable code that determines when a write from the at least one host to available space of the first storage pool causes a predetermined threshold, corresponding to the available space of the first storage pool, to be exceeded; and
       executable code that, by configuration of the cloud appliance, moves at least one of the unused data devices from the at least one spares pool to the first storage pool in response to determining that the predetermined threshold is exceeded.

17. A data storage device, according to claim 16, wherein the predetermined threshold corresponds to an amount of used storage space that varies according to at least one of: the size and activity level of the first storage pool.

18. A data storage device, according to claim 16, wherein the data devices are logical devices.

19. A data storage device, according to claim 16, wherein the directors include executable code that determines if the at least one spares pool contains sufficient data devices to provide the first storage pool with enough memory for data written thereto.

* * * * *